Feb. 6, 1968 HIDEO YOKOTA 3,367,595

ROTARY DRUM FOR MAGNETIC TAPE REELS

Filed July 11, 1966 2 Sheets-Sheet 1

INVENTOR.
HIDEO YOKOTA
BY
McGlew and Toren
Attorneys

Feb. 6, 1968 HIDEO YOKOTA 3,367,595

ROTARY DRUM FOR MAGNETIC TAPE REELS

Filed July 11, 1966 2 Sheets-Sheet 2

INVENTOR.
HIDEO YOKOTA

BY McGlew and Toren
Attorneys

United States Patent Office 3,367,595

Patented Feb. 6, 1968

3,367,595

ROTARY DRUM FOR MAGNETIC TAPE REELS

Hideo Yokota, 2–27 1-chome, Nishinakanobu, Shinagawa-ku, Tokyo, Japan

Filed July 11, 1966, Ser. No. 564,123
Claims priority, application Japan, May 25, 1966, 41/32,957
3 Claims. (Cl. 242—68.3)

ABSTRACT OF THE DISCLOSURE

A rotary drum for magnetic tape reels is disclosed as comprising a cylindrical wall slightly inwardly of the periphery of the drum. A cylindrical elastic ring surrounds this wall and is arranged to have frictional engagement with the wall and with a reel fitted on the drum. A cap member is arranged concentrically of the drum, guided by the cylindrical wall, and is formed to be axially displaced to clamp the cylindrical ring against the cylindrical wall of the drum and against a reel mounted on the drum.

This cap member is provided with a rotary operating knob and a cam is rotatable with the knob and operable to effect the axial displacement of the cap member. Elongated pieces or fingers are reciprocable radially through slots in the cap member and are operable to be projected outwardly over the outer surface of the tape reel to prevent separation of the latter from the rotary drum.

*Background of the invention*

This invention relates to a rotary drum for magnetic tape reels. More particularly, this invention relates to a rotary drum, in an electronic computer, for supporting and driving magnetic tape reels.

Supporting devices for magnetic tape reels of this kind, have been described in applicant's copending U.S. patent application Ser. No. 557,517, filed on June 14, 1966, and the object of the cited patent application is to provide a rotary drum for magnetic tape reels in an electronic computer, wherein magnetic tape reels can be installed onto a rotary drum by the friction of an elastic annular member which is placed between the rotary drum and the reels, and wherein the friction effect of the annular member is easily adjustable and releasable by turning a rotary knob provided on a cap member of the rotary drum.

The present application relates to certain modifications in the construction of the cited U.S. patent application to subserve the same purpose as recited above and, moreover, has as its object to provide a rotary drum in an electronic computer for supporting and driving magnetic tape reels, wherein the magnetic tape reel which is apt to be set apart somewhat from the base of the rotary drum can be depressed onto the base of the rotary drum at the same time that it is engaged with the lateral side thereof.

A further object of the present invention is to provide a magnetic drum for supporting and driving magnetic tape reels, which is durable and can be employed over a prolonged term without trouble.

With these and other objects in view, the arrangement and construction of each part of this invention will be described in the following specification and the appended claims.

Figure 1:
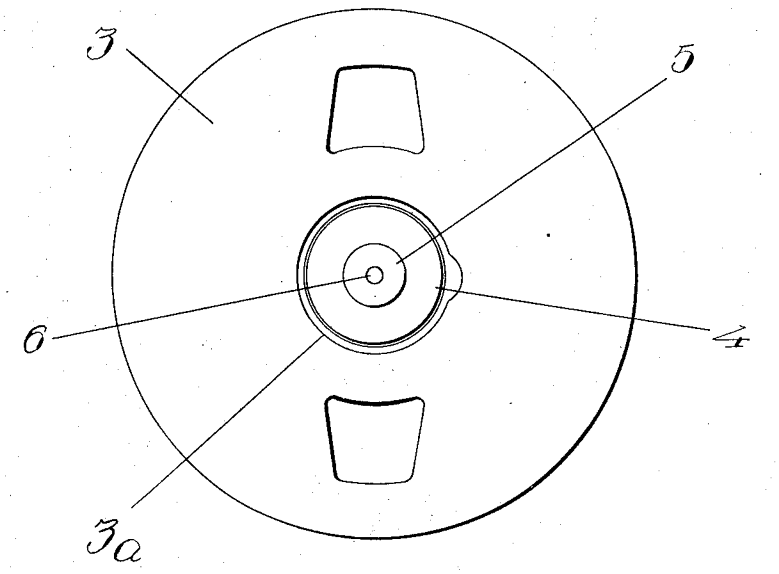
FIG. 1 is a plan view showing an embodiment of this invention.

Referring to the accompanying drawings in detail, 1 is a rotary drum, 2 an elastic annular friction ring, 3 a reel, 4 a cap, 5 a rotary knob, 6 a first cam member, 7 a second cam member, or cam plate, and 8 a coupling rod.

A stub 11 of the rotary drum 1 is formed with an internal thread 11*a*, and slightly inwardly of the rim 12 of the drum 1 is formed an integral upright circular wall 13 provided with a step 13*a* on its upper edge.

The elastic annular ring 2, which preferably is made from plastics material, such as polyurethane, neoprene and the like, has an inwardly canted edge 2*a* on its upper internal periphery and regularly spaced longitudinal grooves 21 on its outer surface to engage with the inner rim of a reel 3 detachably fitted thereto, and is disposed to fit around the outer surface of the above-mentioned circular wall 13 of the drum 1.

An aperture 41 is provided centrally of the cap member 4 to receive the correspondingly shaped projection 52 of the rotary knob 5.

The peripheral portion of the cap member 4 is formed with a downwardly extending annular flange 42 having a canted lower edge 42*a* lower portion, and with a downwardly extending annular projection 42*d* defining, with annular flange 42, an annular recess 42*c* to receive the step 13*a* of the circular wall 13, so that the annular flange 42 of the cap 4 can descend on the ring 2 and into the gap formed by the ring 2 and the step 13*a* of the circular wall 13.

Furthermore, three elongated pieces 44, 45, 46 provided with oblong slots 43 are attached to the reverse side of the cap member 4 by screws 47 so as to be moved in and radially through slots 42*b* and 42*e*. The pieces 44, 45, 46 are retained by the free ends of the spring wires 48 attached to the annular projection 42*d* of the cap 4.

The rotary knob 5 is provided with a circular bore 51 and a square bore 51*a* contingent to the circular bore 51, and the first cam member 6 is inserted snugly into circular bore 51 and the square bore 51*a*. The second cam member, or cam plate, 7 is secured to the reverse side of the projection 52 of the cap member 4.

Figure 4:
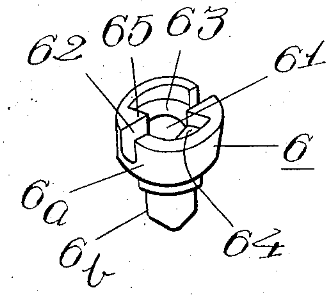
FIG. 4 is a perspective view of the first cam member.

The cam member 6 consists of the upper circular block 6*a* and the lower square block 6*b*, and is formed with a central bore 61. A U-shaped groove 62 is formed diametrically of the upper surface of the circular block 6*a*. As shown in FIG. 4, the internal surfaces of the semi-cylindrical or quonset-shaped pieces formed by the groove 62 are provided with undercut inclined surfaces 63, 64 and the shoulders 65, 65 formed diagonally oppositely on both sides of the groove 62. The inclined surfaces 63, 64, whose lowermost ends meet the bottom of the U-shaped groove 62 at the opposite ends thereof, are inclined upwardly therefrom in the opposite direction and are cut short by the shoulders 65, 65.

Figure 3:
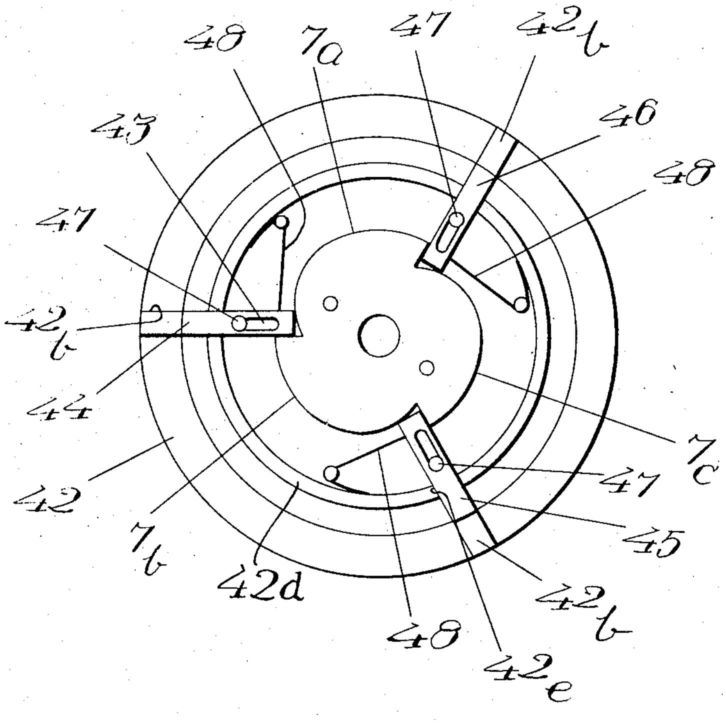
FIG. 3 is a plan view showing the reverse side of the cap.

Cam plate 7 has a configuration such as shown in FIGS. 3 and 4, and has three curved edges 7*a*, 7*b*, 7*c* against which the ends of the pieces 44, 45, 46 are resiliently biased by the spring wires 48.

The upper part of the coupling rod 8 is formed with a hole to receive a cotter pin 81, while the lower part thereof is formed with an external thread 8*a*, and the rotary drum 1, cap 4 and rotary knob 5 are fastened together by the coupling rod 8.

Figure 2:
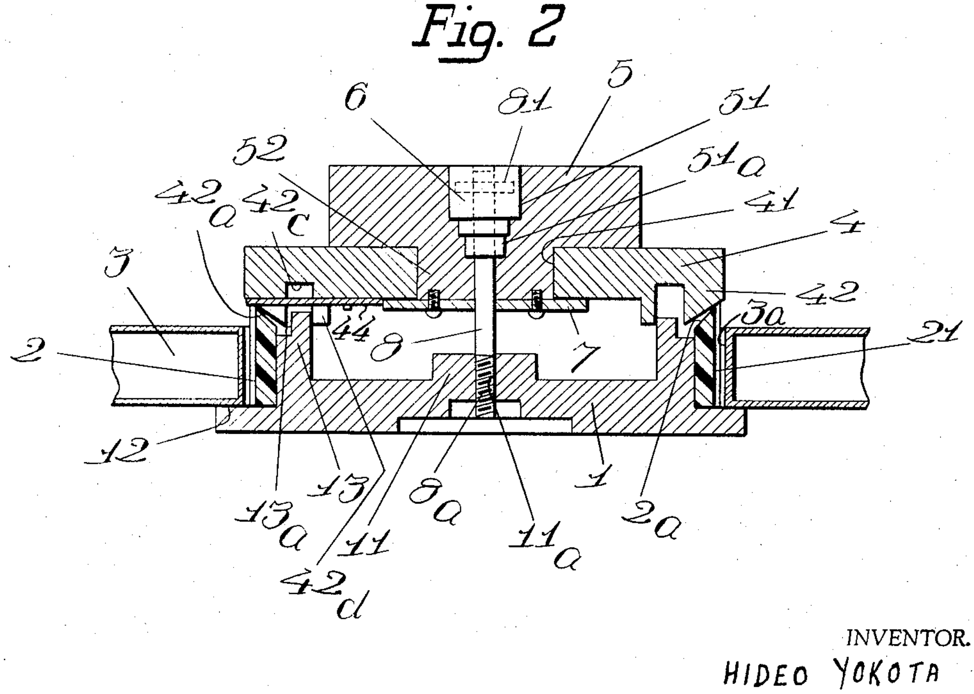
FIG. 2 is a sectional side elevation showing the construction of the essential parts thereof.

Explaining the operation, the rotary knob 8 is turned in the direction to screw the coupling rod 8 from the position as shown in FIG. 2. As the cam 6 is rotated therewith, the pin 81 inserted in the hole of the coupling rod 8 will travel upwardly along the inclined surfaces 63, 64. Since the distance of the pin 81 from the external thread *8a* of the rod 8 remains the same, the cap 4 is lowered as the result of such movement of the pin 81. As the inwardly canted edge 42*a* of the circular flange 42 is lowered and engages with the canted edge 2*a* of the ring 2, the latter is bent inwardly at the same time that it is expanded laterally, and the outer surface thereof, formed with regularly spaced longitudinal grooves 21, is pressed onto the inner rim 3*a* of the reel 3, so that the rotary drum 1 and the reel 3 are linked together. If the rotary knob 5 is turned in the reverse direction, the reel 3 can be set free from the drum 1.

When the tape reel 3 is fitted onto the lateral face of the drum, the same is apt to be separated from the base thereof. However, according to the present invention, when the rotary knob 5 is turned in the direction to engage the rotary drum 1 with the reel 3, the cam plate 7 is rotated therewith, and the three elongated pieces 44, 45, 46 pressed by the curved surfaces 7*a*, 7*b*, 7*c* of the cap plate 7 are projected outwardly from the cut-out portions 42*b* of the circular flange 42. In this way, the reel 3, which is apt to be somewhat separated from the base 12 of the rotary drum 1 when engaged with the lateral side thereof, may be depressed and fitted tightly onto the base of the rotary drum 1.

With the construction of the present invention, as noted above, a tape reel can be pressed onto the magnetic drum and engaged therewith easily and speedily in an optimum state, and can be readily disengaged from the magnetic drum. Moreover, a tape reel which is separated some distance from the base of the drum can be depressed slightly and linked to the magnetic drum 1 in the optimum state. In addition, even if the tape reel has been separated from the base of the magnetic drum, when engaged with the lateral side of the magnetic drum, it can automatically be engaged tightly with the base of the magnetic drum at the same time that it is engaged with the lateral side thereof.

Although the present invention has been described with reference to a preferred embodiment thereof, it is to be noted that the same is not restricted thereto, but comprises all other structures coming within the scope of the invention defined by the appended claims.

I claim:

1. A rotary drum for magnetic tape reels comprising a circular upright wall member slightly inward of the drum rim and formed with a step on its upper surface, an elastic ring installed on the outer side of the circular wall member for engaging with a reel which is fitted detachably thereto, a cap member having slots and provided with a knob, a cam rotatable with said knob, elongated pieces reciprocable radially through said slots in said cap member and operable by said cam to depress a tape reel and to fit a reel onto the base of the rotary drum at the same time that the cap is turned in the direction to clamp a tape reel to the drum.

2. A rotary drum for magnetic tape reels, as claimed in claim 1, in which said cylindrical ring has a beveled outer end surface, said cap member having a beveled surface cooperable with the beveled surface on said cylindrical ring to effect such displacement of said cylindrical ring.

3. A rotary drum for magnetic tape reels, as claimed in claim 1, including a second cam rotatable with said knob and operatively connected to said elongated pieces to reciprocate the latter radially.

References Cited

UNITED STATES PATENTS

| | | | |
|---|---|---|---|
| 3,053,466 | 9/1962 | Rehklau | 242—68.3 |
| 3,083,927 | 4/1963 | Prosin | 242—68.3 |
| 3,250,485 | 5/1966 | Fugit | 242—68.3 |

FRANK J. COHEN, *Primary Examiner.*

N. L. MINTZ, *Assistant Examiner.*